Figure 1:
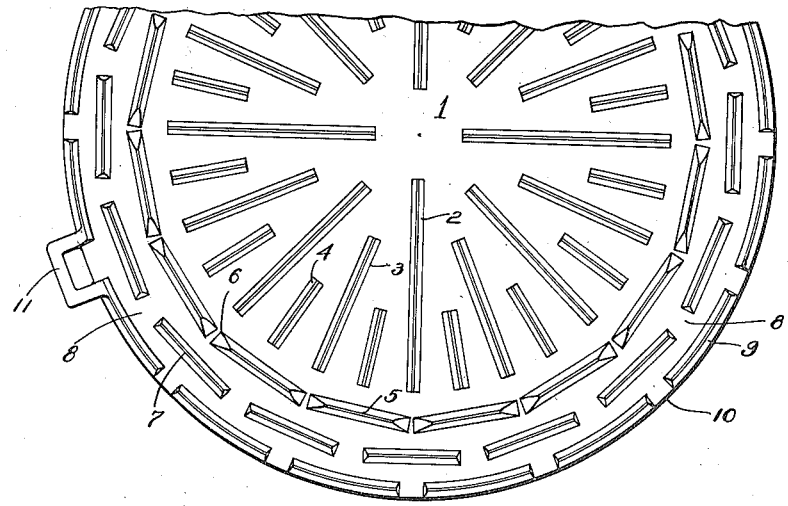

W. R. JEAVONS & A. R. WHITTAKER.
COOKING UTENSIL.
APPLICATION FILED APR. 9, 1912.

1,181,140.

Patented May 2, 1916.

UNITED STATES PATENT OFFICE.

WILLIAM R. JEAVONS, OF CLEVELAND HEIGHTS, AND ARNOLD R. WHITTAKER, OF CLEVELAND, OHIO.

COOKING UTENSIL.

1,181,140.  Specification of Letters Patent.  Patented May 2, 1916.

Application filed April 9, 1912. Serial No. 689,614.

*To all whom it may concern:*

Be it known that we, WILLIAM R. JEAVONS and ARNOLD R. WHITTAKER, residing at Cleveland Heights and Cleveland, respectively, in the county of Cuyahoga and State of Ohio, have invented a certain new and useful Improvement in Cooking Utensils, of which the following is a full, clear, and exact description, reference being had to the accompanying drawings.

This invention relates to cooking utensils, and more especially to the bottoms of such utensils, the purpose being to so construct such bottoms that they will secure an even distribution of heat throughout the entire area thereof, even though the utensil of which the peculiarly constructed bottom forms a part may be tilted at a considerable angle from a horizontal plane.

A further object of the invention is to provide a device of this kind which will be extremely efficient in utilizing the heat units applied, reducing to a minimum the losses due to the escape of heated gases around the edges of the utensil.

Still further and more generally speaking, the invention may be defined as consisting of the combinations of elements embodied in the claims hereto annexed and illustrated in the drawings forming part hereof, wherein—

Figure 2:
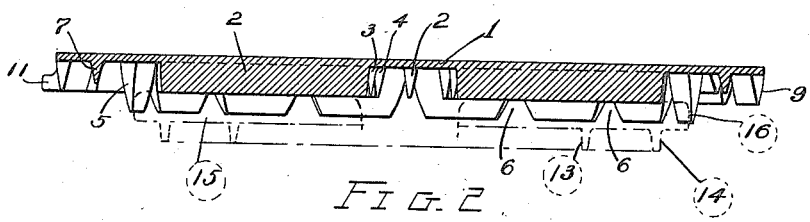
Figure 3:
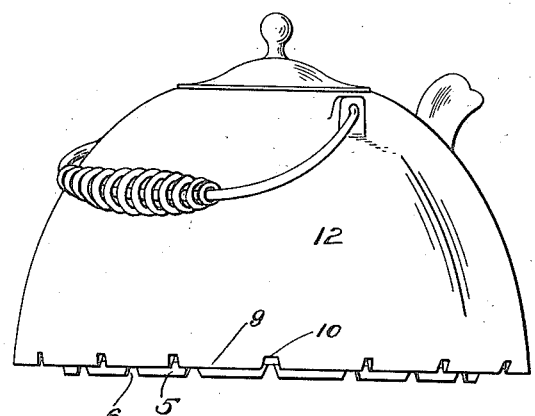

Figure 1 represents a portion of the bottom of a cooking utensil constructed in accordance with our invention, the utensil in this case being a griddle; Fig. 2 represents a vertical sectional view through the device shown in Fig. 1; Fig. 3 represents an elevation of another utensil (a kettle), the bottom of which is constructed in accordance with our invention.

Referring more particularly to Figs. 1 and 2 and describing by reference characters the various parts illustrated therein, 1 denotes a plate, which may form the bottom of the utensil, herein shown as a griddle. The plate may be constructed of any desired material, aluminum having been found particularly well adapted for use in connection with griddles. This plate is preferably circular in shape and has cast therewith and depending from the under surface thereof of three series of radial ribs, the ribs 2 of one series extending nearly to the center of the plate, the ribs 3 of another extending inwardly a shorter distance than the ribs 2, while the ribs 4 extend inwardly a still shorter distance, the outer ends of all the ribs being substantially the same distance from the center of the plate. All of the foregoing ribs project substantially the same distance downwardly from the bottom of the plate, the arrangement greatly increasing the heating surface provided on the bottom of the plate, the ribs absorbing the heat from the products of combustion of the burner that may be located beneath the plate and conducting such heat to the plate. As is well known, a greater proportion of the products of combustion from a burner impinge against the central portion than against the outer portion, and the arrangement of the inner ends of the ribs 2, 3 and 4 provides a gradually increasing conducting area from the center toward the periphery of the plate, and this arrangement is designed to offset the unequal distribution of the products and to so utilize the heat therefrom that the plate will be substantially uniformly heated. With the foregoing construction, however, it is evident that, with plates of comparatively small area, some products of combustion are apt to pass more or less freely around the periphery of the plate without having a high proportion of the heat units extracted therefrom. Furthermore, should the plate become tilted in any manner, one side of the plate will be heated to a higher temperature than the other. By the construction now to be disclosed, the loss of heat through the foregoing causes is largely, if not practically, overcome.

Surrounding the outer ends of the ribs 3, and preferably spaced a short distance therefrom, is a downwardly directed discontinuous or segmental flange, said flange being polygonal and consisting of a plurality of segments 5. These segments are preferably straight, one segment being provided for each group of ribs 2, 3, 4 and having its central portion opposite to a rib 4 and extending at right angles to said rib. It will be observed from Fig. 2 that the flange segments 5 project downwardly a considerable distance below the ribs 2, 3, and 4 and that the flange segments are tapered from top to bottom and are separated by V-shaped notches or recesses 6, said notches or recesses extending to the bottom of the plate 1. Surrounding the discontinuous flange formed by the segments 5 is a second polygonal flange comprising the flange segments 7. The flange segments 7 are considerably shorter than the segments 5—in fact, they project downwardly a shorter distance than do the ribs 2, 3 and 4. The flange segments 7 are preferably straight and are arranged with their central portions opposite the notches 6 between the flange segments 5. The segments 7 are spaced apart, there being substantially rectangular recesses 8 therebetween.

The extreme peripheral edge of the plate is provided with a circular discontinuous flange formed from a plurality of segments 9, separated by recesses 10, the central portion of each segment 9 being opposite a recess 8 between the flange segments 7. The flange segments 9 extend downwardly a greater distance than do the segments 7, the projection of the flanges 9 being substantially equal to that of the ribs 2, 3 and 4. The flange segments 7 and 9 are preferably tapered. When the plate is to be used by itself, as a griddle, it may be provided with a loop 11 for the application of a lifter thereto.

In Fig. 3 our invention is shown as forming the bottom of a kettle 12. The plate 1, whether it is part of a griddle (and hence itself a utensil) or the bottom of a cooking utensil, is adapted to coöperate with a grate, indicated in dotted lines in Fig. 2 and adapted to rest on the top of a gas or vapor stove. The particular form of grate which is adapted to so coöperate with the utensil comprises an inner ring 13 and an outer ring 14 connected by radial bars 15. The bars extend beyond the ring 14 and are rounded or tapered at their outer ends, as shown at 16, being of such length as to fit within the flange segments 5. By this construction, the utensil having the parts hereinbefore described may be centered on the grate with its edge projecting considerably beyond the ends of the arms. The discontinuous flange comprising the segments 5 thus assists to centralize the utensil upon the grate and, on account of its depth, to dam up the gases and prevent them from escaping around the edges of the plate before giving up their heat units to the plate. The particular shape of the notches 6 allows the gases to escape gradually as they collect beneath the plate. With a burner of normal capacity, the discontinuous flange will be filled from the top to the bottom with practically no escape of gases except through the notches, the notches serving to accommodate practically the capacity of the burner and the gases accumulating downwardly until they reach the bottom of the segmental flange.

Should the plate be tilted, the provision of the ribs 2, 3 and 4 and the construction of the discontinuous flange will prevent the escape of all the products at the high side of the plate and will secure a uniform distribution of the heat throughout the plate, even with the upper side of the plate as much as one-half inch above the lower.

By the construction illustrated and described herein, the products of combustion are distributed, with practically no obstruction, from the central portion of the utensil or vessel bottom to the first segmental flange, located near the periphery of the utensil or vessel bottom. The particular arrangement of the ribs 2, 3, and 4 and the relative lengths of the same are such that these ribs offer no substantial obstruction to the flow of the products but at the same time serve, not only to increase the surface area of the central portion of the utensil or vessel bottom but to secure uniform heating of all that portion of the utensil or vessel bottom within the innermost segmental flange. The innermost segmental flange serves to throttle the flow of the products of combustion and, on account of the shape and size of the notches 6, will retain the products within the innermost flange with practically no escape beneath the bottom. When the utensil or vessel bottom is tilted at a considerable angle this flange will maintain the products within the area bounded thereby, whereby the said utensil or vessel bottom will be uniformly heated within this area, notwithstanding such extreme tilting. At the peripheral portion of the utensil or vessel bottom (between the internal and external flanges) the products are subjected to an increasing resistance to their escape as they approach the outer periphery. The segmental flange 7, being of less depth than the internal and external segmental flanges, resists the flow of the products from the internal to the external segmental flange, assists in distributing the products throughout the space inclosed between the internal and external segmental flanges and in the uniform heating of the peripheral portion of the utensil or vessel bottom. The outermost segmental flange, being deeper than the intermediate segmental flange, serves to retain the escaping products until they have accumulated downwardly as far as the bottom of the flange segments 9, and to equalize the temperature at the outer portion of the utensil or vessel bottom. Briefly, the action of the utensil or vessel bottom is to secure uniform heating of the same throughout its entire area, even should it happen to be tilted at a considerable angle.

Having thus described our invention, what we claim is:

1. A device of the character set forth comprising a substantially flat plate having near its peripheral portion a depending segmental flange, the segments being provided with restricting notches therebetween and the central portion of the plate within such flange being provided with means adapted to equalize the heat imparted to the central portion of the plate by the products of combustion without obstructing the radial distribution of said products to the said flange.

2. A device of the character set forth comprising a substantially flat plate having a plurality of radial ribs at the central portion thereof, said ribs being of varying length, and a segmental flange surrounding the outer ends of the ribs, there being notches between the flange segments serving to restrict or throttle the flow of the products of combustion therethrough.

3. A device of the character set forth comprising a substantially flat plate having a plurality of radial ribs of varying lengths grouped about the central portion of the plate and a segmental flange surrounding the outer ends of said ribs near the periphery of the plate, the segments of the flanges being separated by inverted V-shaped notches serving to throttle the escape of products of combustion therethrough.

4. A device of the character set forth comprising a substantially flat plate having near its periphery a pair of substantially concentric flanges, the outer flange being located substantially at the periphery of the plate and the inner flange comprising a series of segments having notches therebetween adapted to throttle the flow of products of combustion therethrough, the central portion of the plate within the inner flange being provided with projections adapted and arranged to equalize the heat imparted to the central portion of the plate by the products of combustion without obstructing the radial distribution of said products to the said flange.

5. A device of the character set forth comprising a substantially flat plate having a pair of concentric peripheral flanges, one of said flanges being located at substantially the periphery of the plate and the other flange comprising a plurality of segments spaced by inverted V-shaped notches serving to throttle the flow of the products of combustion therethrough, and a second segmental flange interposed between the first two flanges and concentric therewith, the segments of the intermediate flange being staggered with respect to the segments of the innermost flange, and the space within the innermost flange being provided with means adapted and arranged to equalize the temperature imparted by the products of combustion to the portion of the plate within such innermost flange and without obstructing the distribution of such products to the said innermost flange.

6. A device of the character set forth comprising a substantially flat plate having radially extending ribs of varying length extending from the center outwardly, a segmental flange adjacent to and within the periphery of said plate and surrounding the outer ends of said ribs, the segments of said flange being separated by inverted V-shaped notches serving to throttle the escape of the products of combustion therethrough, a peripheral segmental flange projecting from said plate, and an intermediate segmental flange projecting from the plate between the first mentioned flanges and having its segments staggered with respect to the segments of the first mentioned flanges and being shorter than the segments of the first mentioned flanges.

7. A device of the character set forth comprising a substantially flat plate having a plurality of radial ribs of varying length projecting therefrom and grouped about the central portion thereof, a segmental flange surrounding the outer ends of said ribs, within and adjacent to the periphery of the plate, the notches between the flange segments serving to restrict or throttle the flow of the products of combustion therethrough, said plate being provided at the peripheral portion, outside of the said flange, with means for equalizing the temperature throughout such peripheral portion of the plate.

8. A device of the character set forth comprising a substantially flat plate, the central portion whereof is provided with means for distributing the heat of the products of combustion uniformly thereto and having, at its periphery, an increasing resistance to the flow of the products to the periphery, whereby the said plate may be uniformly heated through its extent.

9. A device of the character set forth comprising a substantially flat plate having at its central portion means for conducting heat from the products of combustion to the central portion of the plate and for equalizing the temperature throughout such portion of the plate, a segmental flange surrounding the said central portion of the plate and located within and adjacent to the periphery of the plate, the notches between the flange segments serving to restrict or throttle the flow of the products of combustion therethrough, and said plate being provided at the peripheral portion, outside of the said flange, with means for equalizing the temperature throughout such peripheral portion of the plate.

10. A device of the character set forth comprising a substantially flat plate having a peripheral flange projecting therefrom and serving to throttle the flow of the products of combustion, the portion of the plate within said flange being practically unobstructed to the flow of the products in all directions from the center of the plate toward the flange, and means coöperating with said peripheral flange and with the central portion of the plate for equalizing the temperature throughout the extent of said plate.

In testimony whereof, we hereunto affix our signatures in the presence of two witnesses.

WILLIAM R. JEAVONS.
ARNOLD R. WHITTAKER.

Witnesses:
E. A. DODD,
S. W. THOMAS.